United States Patent [19]

Audeh

[11] Patent Number: 4,904,402

[45] Date of Patent: Feb. 27, 1990

[54] OXIDIZED SULFURIZED ISOBUTYLENE LUBE OIL ADDITIVES

[75] Inventor: Costandi A. Audeh, Princeton, N.J.

[73] Assignee: Mobil Oil Corporation, New York, N.Y.

[21] Appl. No.: 322,336

[22] Filed: Mar. 10, 1989

Related U.S. Application Data

[63] Continuation-in-part of Ser. No. 108,595, Oct. 15, 1987, abandoned.

[51] Int. Cl.$^4$ .......................................... C10M 143/06
[52] U.S. Cl. .................................. 252/46.3; 252/46.4; 252/48.2; 252/55
[58] Field of Search ................. 252/46.3, 46.4, 48.2, 252/55; 568/75, 950

[56] References Cited

U.S. PATENT DOCUMENTS

| | | | |
|---|---|---|---|
| 3,607,748 | 9/1971 | Wilson et al. | 252/48.2 |
| 4,317,738 | 3/1982 | Spence | 252/47.5 |
| 4,344,854 | 8/1982 | Davis et al. | 252/48.2 |
| 4,584,113 | 4/1986 | Walsh | 252/48.2 |

*Primary Examiner*—Jacqueline V. Howard
*Attorney, Agent, or Firm*—Alexander J. McKillop; Charles J. Speciale; Michael J. Mlotkowski

[57] ABSTRACT

Sulfurized isobutylene is reacted with a mild oxidizing agent under conditions sufficient to effect the appearance of new infra red frequency bands at 1300 cm$^{-1}$ and 1030 cm$^{-1}$ indicative of the formation of sulfoxides and sulfones and a liquid oxidized sulfurized isobutylene product soluble in a lubricating composition is recovered. The resulting purified product imparts improved bearing life when incorporated into lubricant compositions.

10 Claims, No Drawings

OXIDIZED SULFURIZED ISOBUTYLENE LUBE OIL ADDITIVES

RELATED APPLICATIONS

This is a continuation-in-part of copending application Ser. No. 108,595, filed Oct. 15, 1987 abandoned.

NATURE OF THE INVENTION

This invention relates to the oxidation products of sulfurized isobutylene and use of these products in lubricating oil formulations.

PRIOR ART

U.S. Pat. No. 4,317,738 discloses that improved dispersants can be prepared by oxidizing an olefin and reacting the oxidized olefin with sulfur or a sulfur-yielding compound and an amine. The olefin can have a molecular weight of from about 150 to 140,000, but preferably ranges from about 300 to 100,000. Dispersants are disclosed to be useful in lubricant compositions when used in amounts of about 0.1 to 10 percent based on the oil.

SUMMARY OF THE INVENTION

In brief, this invention comprises a process for preparing an oxidized sulfurized isobutylene product. The oxidative process is a mild oxidative process and consists of reacting sulfurized isobutylene in a suitable solvent carrier with hydrogen peroxide ($H_2O_2$).

DESCRIPTION OF THE INVENTION

In the present invention the mild oxidation of the sulfurized isobutylene is effected by mixing the liquid sulfurized isobutylene in a suitable liquid organic carrier. Suitable liquid carrier agents include benzene, toluene, xylenes, and others which do not react with the oxidant. A mild oxidizing agent, preferably mixed with an aqueous solution of an acid, such as sulfuric acid is then added to the sulfurized isobutylene solution and the mixture agitated sufficiently to insure contact between the peroxide and the sulfurized isobutylene. The resultant mixture is then allowed to settle into two separate phases and the liquid immiscible organic layer is removed and reserved for further treatment. The organic layer is then further treated such as with a reducing agent to remove any unreacted peroxide and can be further washed to remove traces of acid.

In preparing the oxidized sulfurized isobutybene product of this invention it is preferred to use a mole ratio of oxidizing agent of between 0.5 and 2.5 moles of equivalent oxygen to one mole of sulfurized isobutylene. The sulfurized isobutylene used for the reaction can be any commercially available one. A preferred meterial is a sulfurized isobutylene having an average melecular weight of 432. Reaction temperature can be between 20° and 95° C.

Although hydrogen peroxide is preferred in the practice of this invention, other oxidents which can be used include permanganate, iodate, perborate and dichromate salts as well as per acids such as perchloric, permanganic, permonosulfuric and persulfuric acid and others, tertiary butyl hypochlorite, and acylnitrites.

The reaction between the oxidizing agent and the sulfurized isobutylene results in the appearance of new infra red frequency bands at 1300 $cm^{-1}$ and 1030 $cm^{-1}$ indicative of the formation of sulfoxides and sulfones as shown in the generalized reactions I and II below:

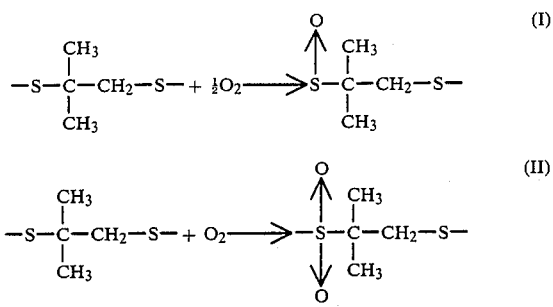

The additive products of this invention are used with lubricating oils or greases to the extent of from about 0.1% to about 10% by weight of the total composition. Furthermore, other additives, such as detergents, antioxidants, antiwear agents and the like may be present. These can include phenates, sulfonates, succinimides, zinc dialkyl dithiophosphates, polymers, calcium and magnesium salts of phenates and sulfonates, including overbased salts of the same, and the like.

The lubricants contemplated for use with the products herein disclosed include mineral and synthetic hydrocarbon oils of lubricating viscosity, mixtures of mineral oils and synthetic oils and greases from any of these, including the mixtures. The synthetic hydrocarbon oils include olefin polymers such as oligomers of hexene, octene, decene, and dodecene, etc. Other synthetic oils, which can be used alone with the compounds of this invention, or which can be mixed with a mineral or synthetic hydrocarbon oil, include (1) fully esterified ester oils, with no free hydroxyls, such as pentaerythritol esters of monocarboxylic acids having 2 to 20 carbon atoms, trimethylolpropane esters of monocarboxylic acids having 2 to 20 carbon atoms, (2) polyacetals and (3) siloxane fluids. Especially useful among the synthetic esters are those made from polycarboxylic acids and monohydric alcohols. More preferred are the ester fluids made by fully esterifying pentaerythritol, or mixtures thereof with di- and tripentaerythritol, with an aliphatic monocarboxylic acid containing from 1 to 20 carbon atoms, or mixtures of such acids.

A wide variety of thickening agents can be used in the grease compositions of this invention. Included among the thickening agents are alkali and alkaline earth metal soaps of fatty acids and fatty materials having from about 12 to about 30 carbon atoms per molecule. The metals are typified by sodium, lithium, calcium and barium. Fatty materials are illustrated by stearic acid, hydroxystearic acid, stearin, cottonseed oil acids, oleic acid, palmitic acid, myristic acid and hydrogenated fish oils.

Other thickening agents include salt and salt-soap complexes as calcium stearate-acetate (U.S. Pat. No. 2,197,263), barium stearate acetate (U.S. Pat. No. 2,564,561), calcium stearate-caprylate-acetate complexes (U.S. Pat. No. 2,999,065), calcium caprylate-acetate (U.S. Pat. No. 2,999,066), and calcium salts and soaps of low-, intermediate- and high-molecular weight acids and of nut oil acids.

Another group of thickening agents comprises substituted ureas, phthalocyanines, indanthrene, pigments such as perylimides, pyromellitdiimides, and ammeline.

The preferred thickening gelling agents employed in grease compositions are essentially hydrophobic clays. Such thickening agents can be prepared from clays which are initially hydrophilic in character, but which have been converted into a hydrophobic condition by the introduction of long chain hydrocarbon radicals onto the surface of the clay particles prior to their use as a component of a grease composition, as, for example, by being subjected to a preliminary treatment with an organic cationic surface active agent, such as an onium compound. Typical onium compounds are tetraalkylammonium chlorides, such as dimethyl dioctadecyl ammonium chloride, dimethyl dibenzyl ammonium chloride and mixtures thereof. This method of conversion, being well known to those skilled in the art, is believed to require no further discussion, and does not form part of the present invention. More specifically, the clays which are useful as starting materials in forming the thickening agents to be employed in the grease compositions, can comprise the naturally occurring chemically unmodified clays. These clays are complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups such as sodium. Hydrophilic clays which are particularly useful for conversion to desired thickening agents include montmorillonite clays, such as bentonite, attapulgite, hectorite, illite, saponite, sepiolite, biotite, vermiculite, zeolite clays, and the like. The thickening agent is employed in an amount from about 0.5 to about 30, and preferably from 3 percent to 15 percent by weight of the total grease composition.

Having described the invention in general aspects, the following examples are offered as specific illustrations.

EXAMPLES

In the following examples the rolling contact fatigue property of lubricants containing the oxidized sulfurized isobutylene of this invention are compared with that of compositions containing non oxidized sulfurized butylene compositions. Lubricant fatigue properties are measured in terms of $L_{10}$ and $L_{50}$ of tapered roller bearing which is the length of time after which 10 percent or 50 percent respectively of a given number of bearings could be expected to fail by rolling contact fatigue.

Example 1

This is an example of the preparation of the reaction products of this invention. A commercially available sulfurized isobutylene (136 grams) was dissolved in 100 ml. of toluene. Ten (10) ml of a 20-percent aqueous solution of sulfuric acid was added to 55 grams of a 30-percent aqueous solution of hydrogen peroxide. The acidified solution of $H_2O_2$ was then added dropwise with constant stirring at ambient room temperature to the solution of isobutylene in toluene. The resulting mixture was heated to about 80° C. and allowed to react for a period of four hours. The mixture was allowed to cool to room temperature and to separate into an aqueous layer and an organic layer. The liquid organic layer was decanted and mixed with about 0.2 grams of manganese dioxide to destroy any unreacted peroxide entrained in the organic layer. This treated layer was then washed with an aqueous solution of sodium bicarbonate and then with water alone. The product was then dried over magnesium sulfate and distilled to remove the toluene under vacuum at room temperature. This product when examined by infra-red analysis exhibited two new absorption bands at 1300 cm$^{-1}$ and 1030 cm$^{-1}$ confirming the formation of sulfoxides and sulfones.

Example 2

This example illustrates the properties of sulfurized isobutylene which has not been mildly oxidized as disclosed herein. One-and-a-half grams of the commercial sulfurized isobutylene used in the preparation of the product of Example 1, was added to 100 grams of a lube oil base stock having a viscosity of 464 centistokes at 40° C., a viscosity of 29.9 at 100° C. and a viscosity index of 93. This mixture was then tested by the 4-ball weld test which measures the ability of the additive to withstand extreme pressure, EP. In this test two results are reported; the first number measures the weld load and is reported in kilograms. The second number is a dimensionless one and is designated as the load wear index (LWI). The formulation in this example yielded the test results: 315 kg and 58.6 LWI, respectively.

Example 3

This example illustrates the properties of the oxidized sulfurized butylene composition prepared in Example 1. In this example 1.5 grams of the material prepared in Example 1 were mixed with 100 grams of the same lube oil and then tested as in Example 2. Results were 315 kg. and and LWI of 58.3.

Examples 1 and 2 demonstrate that both formulationms, Example 1 containing 1.5 percent of sulfurized isobutylene and Example 2 containing oxidized sulfurized isobutylene, have the ability to withstand extreme pressure. Those skilled in the art are aware of the specifications of 250 kg and 45 LWI by which EP additives are measured.

Example 4

The following examples demonstrate the superiority of the oxidized sulfurized butylene compositions over the sulfurized butylene compositions when tested on tapered roller bearings. In this Example 4 the lube oil base stock formulated with sulfurized isobutylene as in Example 2 was tested, yielding an $L_{10}$ of 291 hours and an $L_{50}$ of 564 hours.

Example 5

The same base lube oil stock was formulated with the oxidized sulfurized isobutylene prepared in Example 1 and tested in the tapered roller bearing tester. Results of tests in the tapered roller bearing tester were: $L_{10}$ 405 hours and $L_{50}$ 898 hours. This example demonstrates that the oxidized sulfurized isobutylene extends the $L_{10}$ and $L_{50}$ lives of bearings when compared with the unoxidized sulfurized isobutylene.

Examples 4 and 5 demonstrate that the change in the chemical nature of the sulfurized isobutylene as exhibited in the appearance of the IR bands at 1300 cm$^{-1}$ and 1030 cm$^{-1}$.

Examples 4 and 5 further demonstrate the superiority of the oxidized sulfurized isobutylene by increasing the life of roller bearings.

I claim:

1. A process for making a lubricant additive consisting of reacting a liquid sulfurized isobutylene with a mild oxidizing agent in a mole ratio of oxidizing agent to sulfurized isobutylene of between about 0.5 and about 2.5 moles of equivalent oxygen to 1 mole of sulfurized isobutylene at a reaction temperature between about 20° C. and about 95° C. under conditions sufficient to effect the appearance of new infra red frequency bands at 1300 cm$^{-1}$ and 1030 cm$^{-1}$ indicative of the formation of sulfoxides and sulfones and recovering a liquid oxidized sulfurized isobutylene product soluble in a lubricating composition.

2. The process of claim 1 wherein the sulfurized isobutylene is dissolved in a carrier liquid selected from the group consisting of benzene, toluene, xylenes and others which do not react with the oxidizing agent.

3. The process of claim 1 wherein the oxidizing agent is an aqueous solution of hydrogen peroxide.

4. The process of claim 3 wherein the aqueous solution of hydrogen peroxide is acidified before being reacted with the sulfurized isobutylene.

5. The process of claim 1 wherein the recovered reaction product is purified by washing with water.

6. The process of claim 1 wherein the oxidizing agent is an aqueous solution of potassium or sodium permanganate.

7. The process of claim 1 wherein the oxidizing agent is an aqueous solution of potassium or sodium dichromate.

8. The process of claim 1 wherein the oxidizing agent is an aqueous solution of potassium or sodium iodate.

9. The process of claim 1 wherein the oxidizing agent is an aqueous solution of a potassium or sodium perborate.

10. The process of claim 1 wherein the oxidizing agent is an aqueous solution of a per acid selected from the group consisting of perchloric, permanganic, permonosulfuric and persulfuric acid.

* * * * *